Reissued June 15, 1937 Re. 20,411

UNITED STATES PATENT OFFICE 20,411

DITHIOPHOSPHATE COMPOUNDS

Charles J. Romieux, Summit, and Kenneth D. Ashley, Cranford, N. J., assignors to American Cyanamid Company, New York, N. Y., a corporation of Maine No Drawing. Original No. 1,949,629, dated March 6, 1934, Serial No. 270,796, April 17, 1928. Application for reissue March 2, 1936, Serial No. 66,756

8 Claims. (Cl. 18—53)

This invention relates to new compounds which are adapted for various uses, more particularly as accelerators in the vulcanization of rubber.

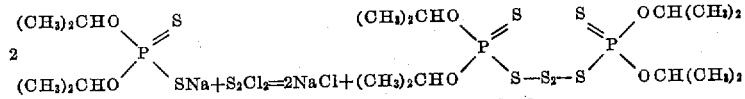

There have been heretofore described certain compounds made by the reaction of phosphorous pentasulphide on organic oxygen containing compounds, such as alcohols and phenols. It has been determined that compounds of this character are di-thiophosphates or di-thiophosphoric acids of either the alkyl or aryl type. We have now discovered that compounds of this character either in the form of the free di-thiophosphoric acid or salts thereof may be caused to react with chorine and with certain chlorine compounds producing commercially valuable substances.

A large variety of chlorine products are adaptable for our purpose, but we find that in general chlorine compounds containing no metallic element are eminently suitable. For example, we have made many reaction products of di-thiophosphates with sulphur mono-chloride, sulphur di-chloride, ethylene di-chloride, ethyl chlorcarbonate, ethylene chlorhydrin, amyl chloride, phosphorous tri-chloride, chlorine and phosgene. We find that the reaction is general and that chlorine compounds other than those specifically named are available for our purpose. The following are examples of the operation of our invention which results in the formation of new compounds of the character above referred to.

*Example 1*

To a well agitated 40 per cent solution of sodium di-iso-propyl di-thiophosphate in water and cooled with ice, sulphur mono-chloride is slowly added and the temperature is not allowed to exceed 10° C. The relative proportions of the reacting ingredients are two molecules of di-thiophosphate and one molecule of sulphur mono-chloride. The oily upper layer which separates from the mixture is dissolved in ether, dried by means of anhydrous sodium sulphate, and freed from ether by evaporation. The reaction product is a yellow, moderately viscous oil. The reaction may be represented by the following equation:

*Example 2*

A similar product may be obtained by using the free di-thiophosphoric acid instead of its sodium salt. To two molecules of free di-iso-propyl di-thiophosphoric acid is added one molecule of sulphur mono-chloride and the mixture kept cool as previously, hydrochloric acid being evolved, whereas in Example 1 sodium chloride is formed and remains in the mixture as such. The product thus obtained from the reactions of either Example 1 or Example 2, reacts with aniline and similar amines at ordinary temperature. Upon mixing such product with aniline, for example, there is no appreciable evolution of heat, but the solution on standing for some time deposits crystals of a compound thereof. The reaction product has been found to be a moderately active accelerator at 258° F. and an extremely active accelerator at 288° F.

*Example 3*

1 per cent excess of sulphur mono-chloride is added slowly with rapid agitation to 99 per cent di-ethyl di-thiophosphoric acid, cooled in an ice bath. The reaction is very vigorous at the start and towards the end the mixture is heated to 50° C. until the evolution of hydrochloric acid has ceased. The liquid is cooled, treated with dilute sodium carbonate solution until it is neutral to litmus, washed with water and dried by shaking with anhydrous sodium sulphate.

*Example 4*

The reaction product of ethylene di-chloride and ammonium di-iso-propyl di-thiophosphate is prepared by heating the two substances in proper proportion for several hours. The reaction may be represented as occurring in two stages by the following two equations:

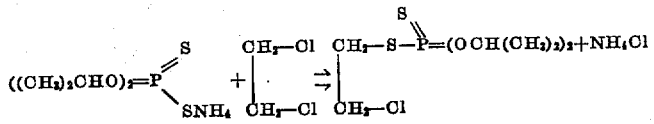

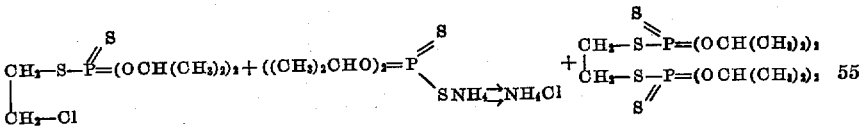

*Example 5*

The ethyl formic ester of di-iso-propyl di-thiophosphoric acid may be readily prepared by providing a solution in acetone of ammonium di-iso-propyl di-thiophosphate, agitating the same vigorously and adding thereto a theoretical amount of ethyl chlorcarbonate, while keeping the solution cool. The reaction mixture is allowed to stand for some time after which the ammonium chloride formed is separated from the solution and washed with acetone. The solution is distilled at reduced pressure to remove the acetone and the liquid thus obtained washed with water and dried.

*Example 6*

Glycol di-iso-propyl dithiophosphate may be prepared by providing a 40 per cent solution in water of sodium di-iso-propyl di-thiophosphate and ethylene chlorhydrin in equimolecular proportions and allowed to stand for several hours. The solution is then heated slowly causing a liquid to separate from the solution and the temperature is maintained at about 90° C. for one hour. The product is washed with water containing sodium carbonate, then with water and subsequently dried with anhydrous sodium sulphate.

*Example 7*

Phosphorous tri-[di-iso-propyl di-thiophosphate] may be produced by adding the theoretical amount of phosphorous tri-chloride to pure di-iso-propyl di-thiophosphoric acid in a vessel equipped with cooling means and a reflux condenser. At the beginning of the reaction hydrochloric acid is rapidly evolved and when the reaction slows down the mixture is heated to 70° C. for about three hours or until the evolution of hydrochloric acid ceases. The reaction may be represented by the following equation:

$$PCl_3+3((CH_3)_2CHO)_2{=}P{<}^{S}_{S-H} \rightarrow \left(((CH_3)_2CHO)_2{=}P{<}^{S}_{S}\right)_3{\equiv}P+3HCl$$

We have described above the preparation of a number of substances all of which may be readily made and which when tested have proven to be accelerators of vulcanization of rubber. These compounds are merely representative members of a large group of compounds which may be formed in accordance with the principles of our invention. Although the di-thiophosphoric acids or phosphates mentioned above are alkyl compounds it is to be understood that our invention is not limited to the alkyl di-thiophosphates, but the aryl compounds are equally adapted for our purpose. For example, a compound is readily formed by the direct reaction of sulphur chloride and diphenyl di-thiophosphoric acid by simply mixing the same with agitation and cooling. Similarly, other aryl compounds of similar constitution may be used.

We have prepared a large number of compounds utilizing the chlorine compounds mentioned in the specific examples given above and in addition have successfully used sulphur di-chloride, amyl chloride, chlorine and phosgene. The chlorine compound is quite analogous to the sulphur mono-chloride compound but contains two less sulphur atoms. Since such a large variety of chlorine compounds are available for this reaction we conclude that the reaction is general and may be carried out with almost any available chlorine compound which does not contain a metallic element. All of the substances mentioned, including chlorine, may be defined as compounds capable of chemically removing hydrogen from the dithiophosphates and such terminology wherever it may occur is intended to have this meaning.

It will be apparent that our invention is of broad scope and is not to be limited by the specific examples given above, but the scope of our invention is set forth in the claims appended hereto. In the claims the term "di-thiophosphate" is intended to include both the aryl and the alkyl compounds, and the salts thereof as well as the free acids.

What we claim is:

1. A vulcanizable rubber composition containing a vulcanization agent and a vulcanization accelerator comprising the reaction product of a di-thiophosphate and a chlorine compound of sulphur.

2. A vulcanizable rubber composition containing a vulcanization agent and a vulcanization accelerator comprising the reaction product of a di-thiophosphate and sulphur mono-chloride.

3. A vulcanizable rubber composition containing a vulcanization agent and a vulcanization accelerator comprising the reaction product of a di-thiophosphate and sulphur mono-chloride, having most probably the following structural formula:

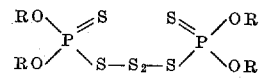

where R represents an alkyl or aryl group.

4. The reaction product of a di-thiophosphate and a chlorine compound of sulphur.

5. The reaction product of a di-thiophosphate and sulphur mono-chloride.

6. The reaction product of a di-thiophosphate and sulphur mono-chloride having most probably the following structural formula:

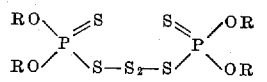

where R represents an alkyl or aryl group.

7. A polythiophosphate compound having the following formula:

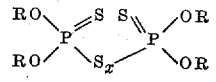

in which R represents an alkyl or aryl group and $x$ represents a whole number greater than 1 and less than 5.

8. A polythiophosphate compound having the following formula:

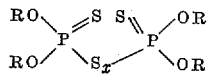

in which R is an alkyl group and $x$ represents a whole number greater than 1 and less than 5.

CHARLES J. ROMIEUX.
KENNETH D. ASHLEY.